United States Patent
Zhang et al.

(10) Patent No.: US 9,509,485 B2
(45) Date of Patent: Nov. 29, 2016

(54) SYSTEMS AND METHODS FOR IN-DEVICE CO-EXISTENCE INTERFERENCE AVOIDANCE FOR DUAL CONNECTIVITY

(71) Applicant: Intel Corporation, Santa Clara, CA (US)

(72) Inventors: Yujian Zhang, Beijing (CN); Satish C. Jha, Hillsboro, OR (US); Ali T. Koc, Portland, OR (US); Youn Hyoung Heo, Seoul (KR); Kathiravetpillai Sivanesan, Richardson, TX (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 14/582,777

(22) Filed: Dec. 24, 2014

(65) Prior Publication Data

US 2015/0327280 A1 Nov. 12, 2015

Related U.S. Application Data

(60) Provisional application No. 61/990,645, filed on May 8, 2014.

(51) Int. Cl.
| | | |
|---|---|---|
| *H04W 72/08* | (2009.01) | |
| *H04L 5/14* | (2006.01) | |
| *H04W 76/04* | (2009.01) | |

(52) U.S. Cl.
CPC ............. *H04L 5/14* (2013.01); *H04W 72/082* (2013.01); *H04W 76/04* (2013.01); *H04W 76/048* (2013.01)

(58) Field of Classification Search
None
See application file for complete search history.

(56) References Cited

U.S. PATENT DOCUMENTS

| | | |
|---|---|---|
| 2012/0082077 A1 | 4/2012 | Zhang et al. |
| 2012/0082140 A1 | 4/2012 | Lin et al. |
| 2012/0155303 A1 | 6/2012 | Kuo |
| 2012/0213162 A1 | 8/2012 | Koo et al. |
| 2013/0303215 A1* | 11/2013 | Piipponen ............. H04W 24/02 455/501 |
| 2014/0050134 A1 | 2/2014 | Ahn et al. |
| 2014/0301361 A1* | 10/2014 | Koo ...................... H04W 36/20 370/331 |
| 2015/0296556 A1* | 10/2015 | Lee ..................... H04W 76/027 370/338 |
| 2015/0382364 A1* | 12/2015 | Sharma ............... H04W 72/082 370/329 |

FOREIGN PATENT DOCUMENTS

WO  2012041255 A1  4/2012

OTHER PUBLICATIONS

Intel 1, "Dual Connectivity and In-Device Coexistence", Aug. 18, 2014, 3GPP TSG RAN1 WG2 Meeting, all pages.*
Intel 2, "Dual Connectivity and In-Device Coexistence", Oct. 6, 2014, 3GPP TSG RAN WG2 Meeting, all pages.*
(Continued)

*Primary Examiner* — Anh Ngoc Nguyen
*Assistant Examiner* — Adam Duda
(74) *Attorney, Agent, or Firm* — Stoel Rives LLP (57) ABSTRACT

Systems and methods disclosed herein provide in-device co-existence interference avoidance for a wireless communication device in dual connectivity with a master node and a secondary node. Time-division multiplexing (TDM) assistance information sent by the wireless communication device is forwarded from the master node to the secondary node. The master node and/or the secondary node uses the TDM assistance information to determine a TDM solution for the in-device co-existence interference in the wireless communication device.

21 Claims, 5 Drawing Sheets

(56) References Cited

OTHER PUBLICATIONS

3GPP TS 36.300, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", V12.1.0, Mar. 2014, pp. 15-19 and pp. 188-190.

3GPP TS 36.331, "Technical Specification Group Radio Access Network; Evolved Universal Terrestrial Radio Access (E-UTRA); Radio Resource Control (RRC); Protocol Specification (Release 12)", V12.1.0, Mar. 2014, pp. 18-20, pp. 111-112, and pp. 133-134.

Intel Corporation, "Dual connectivity and in-device coexistence", R2-143194, 3GPP TSG RAN1 WG2 Meeting #86, Dresden, Germany, Aug. 18-22, 2014, 3 pages.

Intel Corporation, "Dual connectivity and in-device coexistence", R2-144143, 3GPP TSG RAN WG2 Meeting #87bis, Shanghai, China, Oct. 6-10, 2014, 6 pages.

Fujitsu, NSN, Pantech, "MRO and MDT Impacted by in-device coexistence interference", R2-141521, 3GPP TSG-RAN WG2 Meeting #85bis, Valencia, Spain, Mar. 31-Apr. 4, 2014, 4 pages.

Nokia Siemens Networks, "Inter-eNB Communication for In-Device Coexistence (IDC)", R3-122151, 3GPP TSG-RAN WG3 Meeting #77bis, Lecce, Italy, Oct. 8-12, 2012, 2 pages.

Pantech, "Further issues on IDC assistance information", R2-123274, 3GPP TSG-RAN WG2 Meeting #79, Qingdao, China, Aug. 13-17, 2012, 3 pages.

PCT/US2015/025190, International Search Report and Written Opinion, Jul. 16, 2015, 14 pages.

\* cited by examiner

SYSTEMS AND METHODS FOR IN-DEVICE CO-EXISTENCE INTERFERENCE AVOIDANCE FOR DUAL CONNECTIVITY

RELATED APPLICATIONS

This application claims the benefit under 35 U.S.C. §119 (e) of U.S. Provisional Application No. 61/990,645, filed May 8, 2014, which is hereby incorporated by reference herein in its entirety.

TECHNICAL FIELD

This disclosure relates to wireless communication networks. Specifically, this disclosure relates to systems and methods for in-device co-existence interference avoidance.

DETAILED DESCRIPTION OF PREFERRED EMBODIMENTS

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Systems and methods disclosed herein provide in-device co-existence interference avoidance for a wireless communication device, known as user equipment (UE), operating in dual connectivity in a heterogeneous wireless communication system. In third generation partnership project (3GPP) long term evolution (LTE) systems, as discussed in detail below, dual connectivity allows a UE to consume radio resources provided by at least two different 3GPP network nodes (e.g., a master node and a secondary node) connected to each other with non-ideal backhaul (e.g., an X2 interface). Due to signaling limitations and system frame number (SFN) timing offset between the master node and the secondary node, current 3GPP systems do not provide in-device co-existence interference avoidance for UEs operating in dual connectivity.

As wireless communication becomes more and more popular at offices, homes, and schools, different wireless technologies and applications may work to meet the demand for computing and communications at any time and/or anywhere. For example, a variety of wireless communication networks may co-exist to provide a wireless environment with more computing and/or communication capability, greater mobility, and/or seamless roaming.

In particular, wireless mobile communication technology may use various standards and protocols to transmit data. Wireless communication system standards and protocols can include, for example: the 3GPP LTE standard; the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as WiFi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a UE.

Although each of the above-mentioned wireless communication networks may support different usages, simultaneous use of two or more of these technologies by a UE can cause interference or collisions, resulting in impaired performance. For example, a UE may be equipped with an LTE transceiver, a Wifi or other wireless local area network (WLAN) transceiver, a Bluetooth® transceiver, and global navigation satellite system (GNSS) receivers. Due to the extreme proximity of multiple radio transceivers within the same UE operating on adjacent frequencies or sub-harmonic frequencies, the interference power coming from a transmitter of the collocated radio may be much higher than the actual received power level of the desired signal for the receiver. This in-device coexistence (IDC) interference may be difficult to avoid or reduce using filters.

To avoid or reduce IDC interference in certain 3GPP systems, a UE may report IDC assistance information to an eNB. The IDC assistance information includes a list of E-UTRA carriers suffering from IDC interference problems and the direction of the interference. Depending on the scenario, the IDC assistance information may also include time-division multiplexing (TDM) patterns or parameters to enable appropriate discontinuous reception (DRX) configuration for TDM solutions on the serving E-UTRA carrier. TDM assistance information can be either DRX configuration parameters or a hybrid automatic repeat request (HARQ) bitmap. In DRX configuration parameter (drx-AssistanceInfo), the field drx-Offset depends on SFN timing. HARQ bitmap (IDC-SubframePattern) depends on the duplex and uplink/downlink (UL/DL) configuration in case of time-division duplexing (TDD), and is also related to SFN timing.

The 3GPP Technical Specification (TS) 36.331, V12.0.0 (2013-12) (TS 36.331) provides an example radio resource control (RRC) signaling message for IDC assistance information, which is referred to as an "InDeviceCoexIndication" message and is shown below in abstract syntax notation one (ASN.1) coding:

```
InDeviceCoexIndication-r11-IEs ::=   SEQUENCE {
    affectedCarrierFreqList-r11       AffectedCarrierFreqList-r11   OPTIONAL,
    tdm-AssistanceInfo-r11            TDM-AssistanceInfo-r11        OPTIONAL,
    lateNonCriticalExtension          OCTET STRING                  OPTIONAL,
    nonCriticalExtension              SEQUENCE { }                  OPTIONAL
}
AffectedCarrierFreqList-r11 ::=   SEQUENCE (SIZE (1..maxFreqIDC-r11))
                                              OF AffectedCarrierFreq-r11
AffectedCarrierFreq-r11 ::=   SEQUENCE {
    carrierFreq-r11            MeasObjectId,
    interferenceDirection-r11  ENUMERATED {eutra, other, both, spare}
}
TDM-AssistanceInfo-r11 ::= CHOICE {
    drx-AssistanceInfo-r11              SEQUENCE {
        drx-CycleLength-r11                 ENUMERATED {sf40, sf64, sf80, sf128,
                                                sf160, sf256, spare2, spare1},
        drx-Offset-r11                  INTEGER (0..255) OPTIONAL,
        drx-ActiveTime-r11              ENUMERATED {sf20, sf30, sf40, sf60, sf80,
                                                sf100, spare2, spare1}
    },
    idc-SubframePatternList-r11         IDC-SubframePatternList-r11,
    ...
}
IDC-SubframePatternList-r11 ::=SEQUENCE (SIZE (1..maxSubframePatternIDC-
r11)) OF IDC-SubframePattern-r11
IDC-SubframePattern-r11 ::= CHOICE {
    subframePatternFDD-r11          BIT STRING (SIZE (4)),
    subframePatternTDD-r11          CHOICE {
        subframeConfig0-r11         BIT STRING (SIZE (70)),
        subframeConfig1-5-r11       BIT STRING (SIZE (10)),
        subframeConfig6-r11         BIT STRING (SIZE (60))
    },
    ...
}
```

In a homogeneous 3GPP LTE system, a downlink (DL) transmission may be a communication from a node (e.g., eNB) to a wireless device (e.g., UE), and the uplink (UL) transmission may be a communication from the wireless device to the node. In homogeneous networks, the node, also called a macro node, may provide basic wireless coverage to wireless devices in a cell. The cell may be the area in which the wireless devices are operable to communicate with the macro node.

Heterogeneous networks may be used to handle increased traffic loads on the macro nodes due to increased usage and functionality of wireless devices. Heterogeneous networks may include a layer of planned high power macro nodes (macro-eNBs or macro cells) overlaid with layers of lower power nodes (small cells, small-eNBs, micro-eNBs, pico-eNBs, femto-eNBs, or home eNBs [HeNBs]) that may be deployed in a less well planned or even entirely uncoordinated manner within the coverage area (cell) of a macro node. The lower power nodes (LPNs) may generally be referred to as "low power nodes," small nodes, or small cells.

The macro node may be used for basic coverage. The low power nodes may be used to fill coverage holes within a macro node's geographic coverage area (i.e., cell) and at the boundaries between the macro nodes' coverage areas. Low power nodes may also be used to improve capacity in high use areas and improve indoor coverage where building structures impede signal transmission.

As used herein, the terms "node" and "cell" are both intended to be synonymous and refer to a wireless transmission point operable to communicate with multiple user equipment, such as an eNB, a low power node, or other base station.

Figure 1:
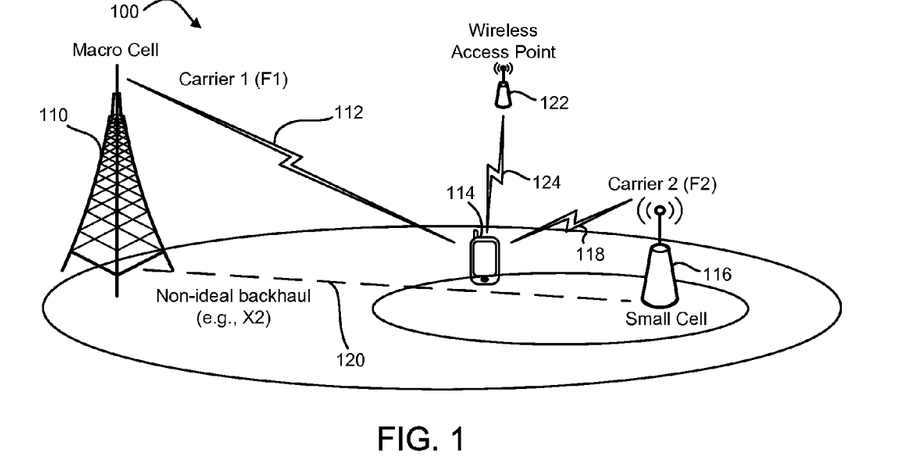
FIG. 1 is a block diagram of a communication network operating in dual connectivity according to one embodiment.

Dual connectivity refers to an operation where a given UE consumes radio resources provided by at least two different nodes connected with non-ideal backhaul. For example, FIG. 1 is a block diagram of a communication network 100 operating in dual connectivity according to one embodiment. The network 100 includes a macro cell 110 configured to establish a wireless connection 112 to a UE 114 using a first carrier frequency F1, and a small cell 116 configured to establish a wireless connection 118 to the UE 114 using a second carrier frequency F2. The macro cell 110 and the small cell 116 communicate with one another through a non-ideal backhaul interface 120 (e.g., an X2 interface). The dual connectivity shown in FIG. 1 provides inter-node radio resource aggregation (or inter-site carrier aggregation) to improve per-user throughput. Dual connectivity allows mobility management to be maintained on the macro layer while aggregating small cells to provide extra user plane capacity to increase throughput. Radio bearers carrying the user data can either use resources of the macro cell 110 only, of the small cell 116 only, or can aggregate both, depending on whether increased coverage, offload, or throughput is desired. Keeping the mobility anchor in the macro cell 110 may help reduce signaling overhead toward the core network.

The nodes (e.g., the macro cell 110 and the small cell 116) involved in dual connectivity for the UE 114 may assume different roles, which do not necessarily depend on the node's power class. For example, one node may act as a master node and one or more additional nodes may act as secondary or slave nodes. Generally, although not always, the macro cell 110 may perform the functions of a master eNB (MeNB) and the small cell 116 may perform the functions of a secondary eNB (SeNB). The MeNB terminates at least S1-MME, which is an interface for a control plane protocol to a mobility management entity (MME) in the core network. Thus, the MeNB acts as a mobility anchor for the UE 114 toward the core network. A group of serving cells associate with the MeNB may be referred to herein as a master cell group (MCG). The SeNB is an eNB, which is not the MeNB, that provides additional radio resources for the UE. A group of serving cells associated with SeNB may be referred to herein as a secondary cell group (SCG).

In addition to communicating with the macro cell 110 and the small cell 116 in dual connectivity, the UE 114 shown in FIG. 1 may also communicate with a wireless access point 122 of a WLAN or other non-3GPP network through a wireless connection 124. The wireless connection 124 may use, for example, a WiFi protocol. The UE 114 includes a first transceiver (not shown) for the wireless connection 112 and/or the wireless connection 118, and a second transceiver (not shown) for the wireless connection 124. As discussed above, IDC interference may result from the simultaneous operation of the first transceiver and the second transceiver.

Certain embodiments provide IDC interference avoidance for one or more of the following example scenarios. In scenario A, an IDC interference problem is experienced in the MCG only, which corresponds to a case where the affectedCarrierFreqList of the InDeviceCoexIndication message discussed above includes frequencies of the MCG cells. In scenario B, an IDC interference problem is experienced in SCG only, which corresponds to a case where the affectedCarrierFreqList includes frequencies of the SCG cells. In scenario C, an IDC interference problem is experienced in both the MCG and the SCG, which corresponds to a case where the affectedCarrierFreqList includes frequencies of both the MCG cells and the SCG cells. An example of scenario C in LTE is when the MCG uses "band 7" while the SCG uses "band 40."

Prior solutions of TDM assistance information in the IDC information do not take into account dual connectivity. As discussed above, TDM assistance information can be either DRX configuration parameters or a HARQ bitmap. In DRX configuration parameter (drx-AssistanceInfo), the field drx-Offset depends on SFN timing. HARQ bitmap (IDC-SubframePattern) depends on the duplex and UL/DL configuration in case of time-division duplexing (TDD), and is also related to SFN timing. Certain embodiments provide signaling and processes to account for SFN timing offset between the MeNB and the SeNB of dual connectivity.

Figure 2:
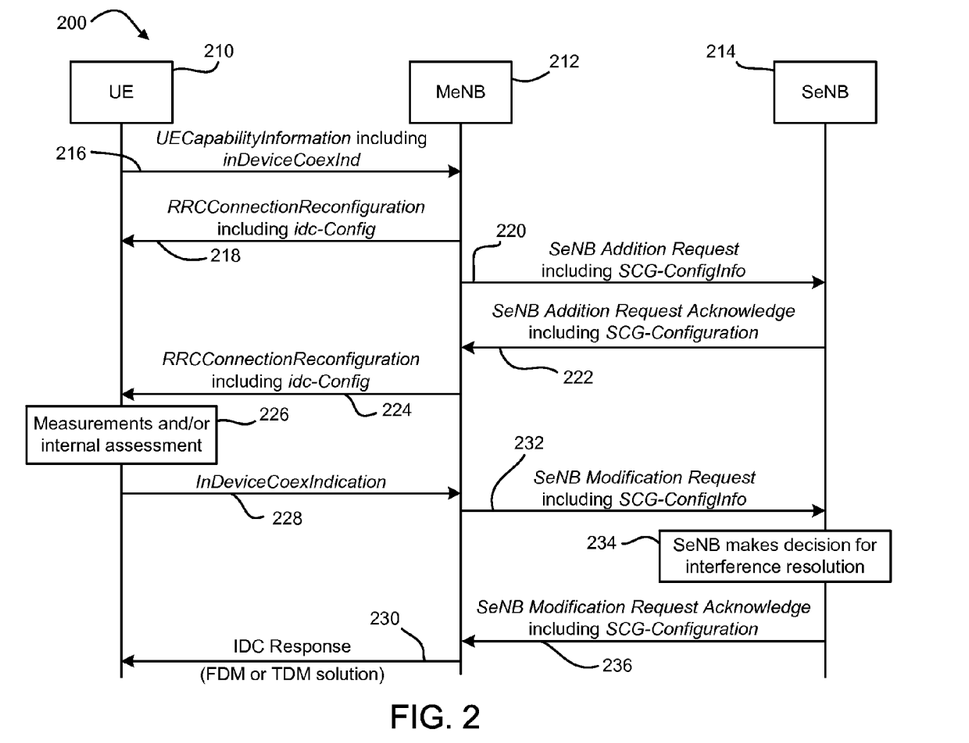
FIG. 2 is a sequence diagram illustrating a process for in device coexistence avoidance in dual connectivity according to one embodiment.

FIG. 2 is a sequence diagram illustrating a process 200 for in device coexistence avoidance in dual connectivity according to one embodiment. The process 200 includes connecting a UE 210 to an MeNB 212 in an MCG and an SeNB 214 in an SCG. This example assumes that there is an IDC interference problem after SCG addition. However, there may be different situations regarding the timing (e.g., IDC interference may occur before SCG addition). Whether the IDC interference occurs before or after SCG addition, inter-node messages (e.g., SCG-Config Info and SCG-Configuration) may be handled the same.

The UE 210 sends the MeNB 212 in the MCG its capability information in a UECapabilityInformation message 216 including an inDeviceCoexInd parameter, as shown in FIG. 2. The inDeviceCoexInd parameter indicates that the UE 210 supports in-device coexistence. The MeNB 212 replies with an RRCConnectionReconfiguration message 218, which includes the idc-Config parameter indicating whether the UE 210 is allowed to send an IDC indication and/or autonomous denial parameters for the MCG. The MeNB 210 also sends the SeNB 214 an SeNB Addition Request message 220, which includes SCG-ConfigInfo parameters. The SCG-ConfigInfo parameters include IDC information (e.g., an indication that the UE 210 supports in-device coexistence).

The SeNB 214 replies to the requesting MeNB 212 with an SeNB Addition Request Acknowledge message 222, which includes SCG-Configuration information. In certain embodiments, the SCG-Configuration information in the SeNB Addition Request Acknowledgement message 222 includes an autonomous denial configuration parameters for the SCG. When the UE 210 is configured for IDC interference avoidance, the UE 210 can autonomously deny LTE uplink (UL) transmission to protect the industrial scientific medical (ISM) band in rare cases if other solutions cannot be used. Configuration of autonomous denial provides the eNB scheduler with flexibility to trade off between the performance of LTE and ISM. Since the MeNB 212 and the SeNB 214 might have different strategies to configure autonomous denial parameters, the MeNB 212 and the SeNB 214 can configure autonomous denial parameters independently.

Once the MeNB 212 receives the SeNB Addition Request Acknowledge message 222, the MeNB 212 sends an RRCConnectionReconfiguration message 224 to the UE 210, which includes an idc-Config parameter indicating whether the UE 210 is allowed to send an IDC indication and/or autonomous denial parameters for the SCG.

After the UE 210 is configured for IDC interference avoidance in MCG and SCG, at block 226 the UE 210 performs internal measurements and/or an internal assessment to determine the impact of the in-device co-existence interference, and whether the UE 210 can resolve the issue by itself. If the UE 210 cannot resolve the interference by itself, the UE 210 sends an InDeviceCoexIndication message 228 to the MeNB 212. The InDeviceCoexIndication message 228 may include assistance information for frequency-division multiplexing (FDM) and/or TDM. If the in-device interference problem is in MCG only, the MeNB 212 may determine a solution to the interference problem, without involving the SeNB 214, and sends an IDC Response message 230 to the UE 210 with either an FDM solution (e.g., handover or SCell release) or a TDM solution (e.g., DRX parameters) for the MCG.

If, however, the in-device interference problem is also (or only) in the SCG, the MeNB 212 sends to the SeNB 214 an SeNB Modification Request message 232 including SCG-Config Info parameters with information that the SeNB 214 uses at block 234 to make a decision for interference resolution in the SCG. The SeNB 214 passes to the MeNB 212 an SeNB Modification Request Acknowledge message 236 that includes SCG-Configuration parameters indicating FDM and/or TDM solutions for the SCG. The MeNB 212 includes the SeNB's FDM or TDM solution in the IDC Response message 230 to the UE 210 for the SCG.

In certain embodiments disclosed below, the InDeviceCoexIndication message 228 includes enhancements for DRX configuration parameters (e.g., the information element (IE) drx-AssistanceInfo shown in the example message above) for dual connectivity. In other embodiments, the InDeviceCoexIndication message 228 includes enhancements for HARQ bitmap patterns (e.g., the IE IDC-SubframePatternList shown in the example message above).

As discussed above, the InDeviceCoexIndication message 228 shown in FIG. 2 may include assistance information for frequency-division multiplexing (FDM) and/or TDM. For FDM, the affectedCarrierFreqList in the InDeviceCoexIndication message 228 may specify the affected frequencies corresponding to the MCG and/or the SCG. For TDM, however, the drx-Offset reported in the InDeviceCoexIndication message 228 is not the same for MCG and SCG due to the SFN timing offset discussed above. Thus, in one embodiment, TDM assistance information with enhanced DRX configuration parameters includes a DRX starting offset according to MCG SFN timing. In another embodiment, TDM assistance information with enhanced DRX configuration parameters includes a DRX starting offset according to SCG SFN timing.

Figure 3:
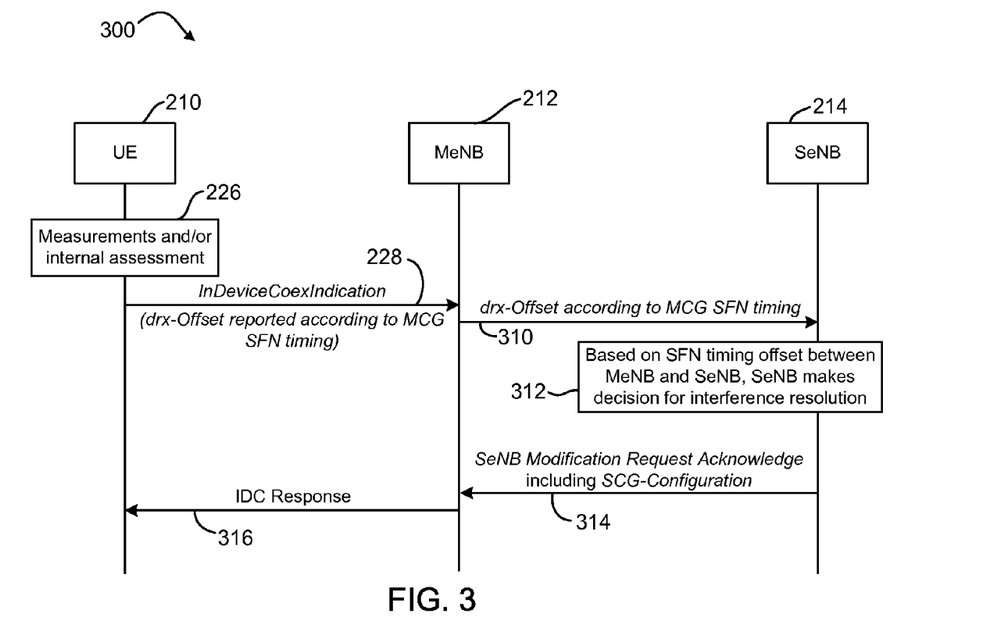
FIG. 3 is a sequence diagram illustrating a process using DRX configuration parameters in dual connectivity according to one embodiment.

FIG. 3 is a sequence diagram illustrating a process 300 using DRX configuration parameters in dual connectivity according to one embodiment. In this example, the process 300 shown in FIG. 3 may in certain instances be the same as the process 200 shown in FIG. 2 up through the block 226 where the UE 210 performs internal measurements and/or an internal assessment to determine the impact of the in-device co-existence interference, and whether the UE 210 can resolve the issue by itself. If the UE 210 cannot resolve the interference by itself, the UE 210 sends an InDeviceCoex-Indication message 228 to the MeNB 212.

In the example shown in FIG. 3, however, the InDevice-CoexIndication message 228 includes a selected DRX starting offset (IE drx-Offset) reported according to MCG SFN timing, regardless of whether the UE 210 detects the IDC problem in the MCG or the SCG. Thus, for example, if there is an IDC problem in the SeNB, the UE 210 sends the RRC message InDeviceCoexIndication 228 with the drx-Offset according to MCG SFN timing. Then, the MeNB 212 sends a message 310 forwarding the drx-Offset according to MCG SFN timing to the SeNB 214. The message 310 in certain embodiments may simply be a copy of the InDeviceCoex-Indication message 228 received from the UE 210.

Based on an SFN timing offset between the MeNB 212 and the SeNB 214, the SeNB 214 at block 312 makes a decision for interference resolution. In other words, the SeNB 214 deduces a suitable timing to configure DRX in SCG such that the IDC problem can be resolved. The SeNB 214 passes to the MeNB 212 an SeNB Modification Request Acknowledge message 314 that includes SCG-Configuration parameters including the DRX configuration parameters for the TDM solutions for the SCG. The MeNB 212 includes the SeNB's TDM solution in the IDC Response message 316 to the UE 210 for the SCG.

Figure 4A:
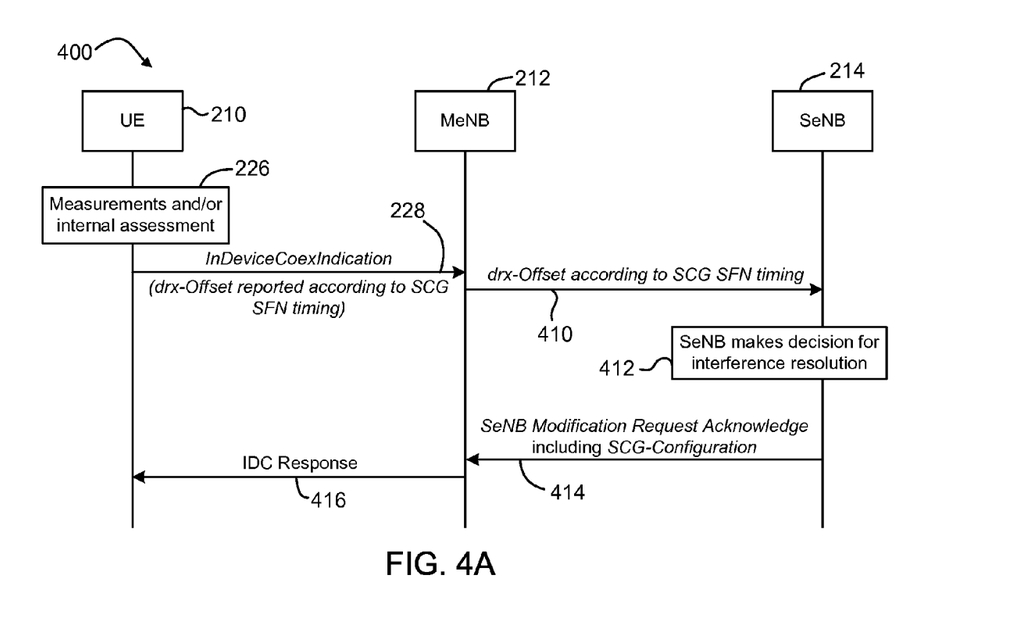
FIGS. 4A and 4B are sequence diagrams illustrating processes using DRX configuration parameters in dual connectivity according to other embodiments.
Figure 4B:
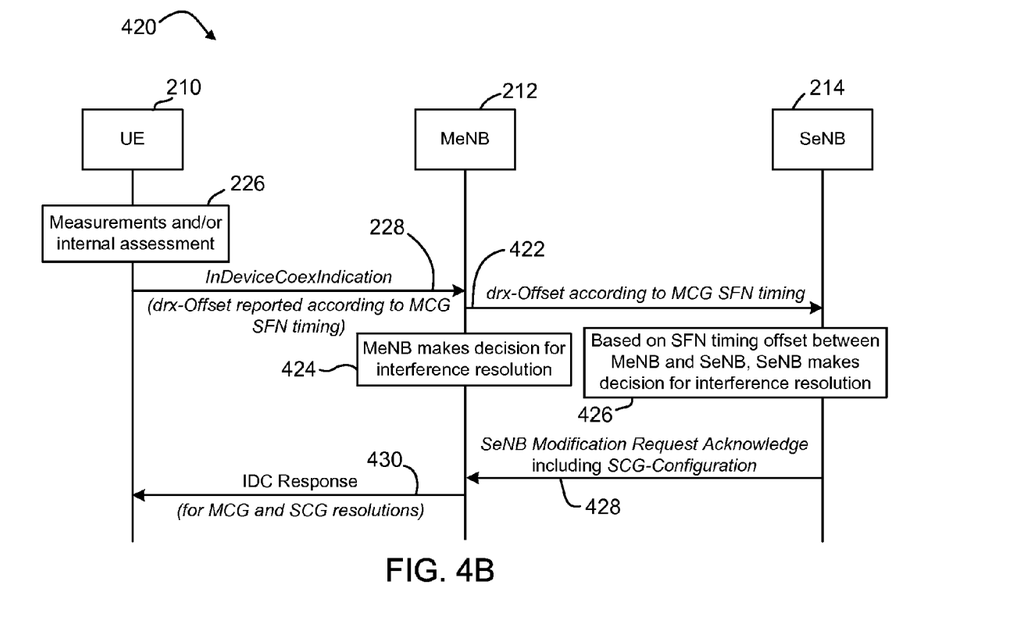

FIGS. 4A and 4B are sequence diagrams illustrating processes using DRX configuration parameters in dual connectivity according to other embodiments. In these examples, the process 400 shown in FIG. 4A and the process 420 shown in FIG. 4B may in certain instances be the same as the process 200 shown in FIG. 2 up through the block 226 where the UE 210 performs internal measurements and/or an internal assessment to determine the impact of the in-device co-existence interference, and whether the UE 210 can resolve the issue by itself. If the UE 210 cannot resolve the interference by itself, the UE 210 sends an InDeviceCoex-Indication message 228 to the MeNB 212.

In the examples shown in FIGS. 4A and 4B, however, the InDeviceCoexIndication message 228 includes a selected DRX starting offset (IE drx-Offset) reported according to the SFN timing of the cell group with the IDC problem. In FIG. 4A, the IDC problem is in the SCG. Thus, the InDeviceCo-exIndication message 228 in FIG. 4A includes a drx-Offset reported according to SCG SFN timing. The MeNB 212 sends a message 410 forwarding the drx-Offset according to SCG SFN timing to the SeNB 214. At block the SeNB 214 uses the drx-Offset according to SCG SFN timing to make a decision for interference resolution. The SeNB 214 passes to the MeNB 212 an SeNB Modification Request Acknowledge message 414 that includes SCG-Configuration parameters including the DRX configuration parameters for the TDM solutions for the SCG. The MeNB 212 includes the SeNB's TDM solution in the IDC Response message 416 to the UE 210 for the SCG.

In addition or in other embodiments that report the DRX starting offset according to the SFN timing of the cell group with the IDC problem, if there are IDC problems in both the MCG and the SCG, the UE 210 is configured to report the selected DRX starting offset according to the SFN timing of the MCG.

In FIG. 4B, for example, the IDC problem detected by the UE 210 is in both the MCG and the SCG. Thus, the UE 210 sends the RRC message InDeviceCoexIndication 228 with the drx-Offset according to MCG SFN timing. The MeNB 212 sends a message 422 forwarding the drx-Offset according to MCG SFN timing to the SeNB 214. At block 424, the MeNB 212 determines the suitable timing to configure DRX in MCG such that the IDC problem in the MCG may be resolved (e.g., the MeNB 212 makes a decision for interference resolution in the MCG). At block 426, based on the SFN timing offset between the MeNB 212 and the SeNB 214, the SeNB 214 determines the suitable timing to configure DRX in the SCG such that the IDC problem in the SCG may be resolved (e.g., the SeNB 214 makes a decision for interference resolution in the SCG). The SeNB 214 passes to the MeNB 212 an SeNB Modification Request Acknowledge message 428 that includes SCG-Configuration parameters including the DRX configuration parameters for the TDM solutions for the SCG. The MeNB 212 includes the MeNB's TDM solution and the SeNB's TDM solution in the IDC Response message 430 to the UE 210 for MCG and SCG resolution.

Figure 5A:
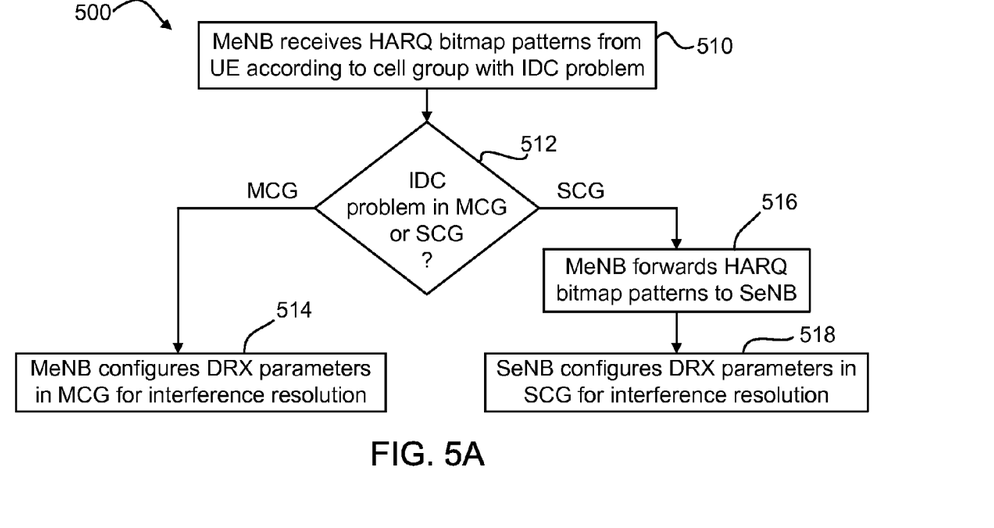
FIGS. 5A and 5B illustrate flow charts of example methods for in-device co-existence interference mitigation using HARQ bitmaps according to certain embodiments.
Figure 5B:
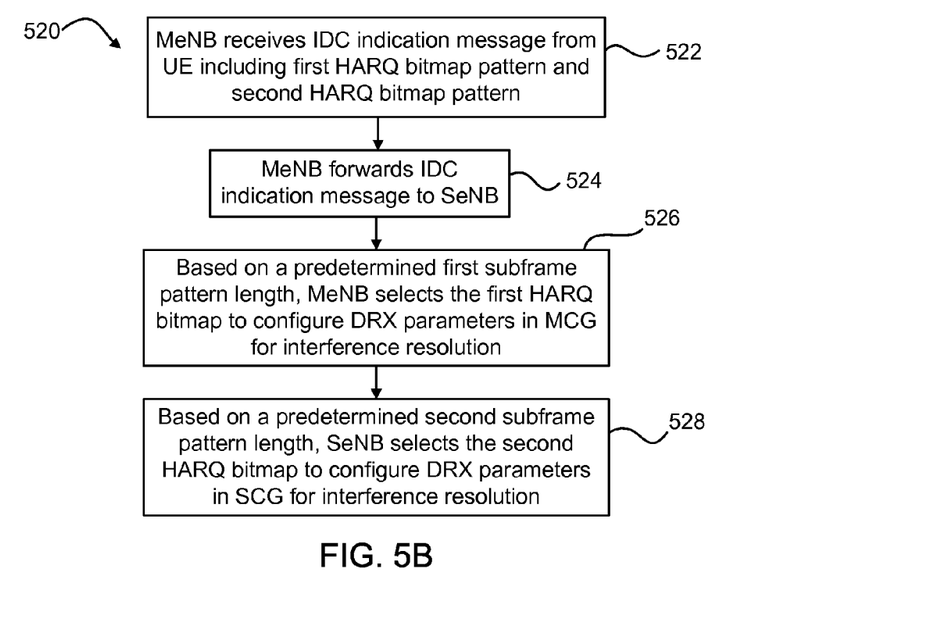

As discussed above, in other embodiments, the TDM assistance information includes a HARQ bitmap, which depends on the duplex and UL/DL configuration and is also related to SFN timing. FIGS. 5A and 5B illustrate flow charts of example methods for in-device co-existence interference mitigation using HARQ bitmaps according to certain embodiments. In FIG. 5A, the illustrated method 500 includes an MeNB receiving 510 HARQ bitmap patterns from a UE according to a cell group with an IDC problem. The UE may send the HARQ bitmap patterns to the MeNB in the IE IDC-SubframePatternList in the example RRC InDeviceCoexIndication message shown above. If there is an IDC problem in the MCG, then HARQ bitmap patterns (IE IDC-SubframePatternList) are reported according to the configuration (e.g., duplex/TDD UL DL configuration) in the MCG. If there is an IDC problem in the SCG, then HARQ bitmap patterns IE IDC-SubframePatternList) are reported according to the configuration (e.g. duplex/TDD UL DL configuration) in the SCG.

Based on the received HARQ bitmap patterns, the MeNB determines 512 whether the IDC problem is in the MCG or the SCG. For example, the MeNB may examine the IE affectedCarrierFreqList to know whether HARQ bitmap patterns (IE IDC-SubframePatternList) are reported for the MCG or the SCG. If the MeNB determines that the IDC problem is in the MCG, the MeNB configures 514 the DRX parameters in the MCG for interference resolution based on the received HARQ bitmap patterns. If the MeNB determines that the IDC problem is in the SCG, the MeNB forwards 516 the HARQ bitmap patterns to the SeNB, and the SeNB configures 518 the DRX parameters in the SCG for interference resolution based on the received HARQ bitmap patterns.

In FIG. 5A, a HARQ bitmap pattern (IE IDC-Subframe-Pattern) is reported according to the cell group with IDC problem. In addition, or in other embodiments, the UE can report multiple HARQ bitmap patterns (IE IDC-Subframe-Pattern) within the IE IDC-SubframePatternList. The method 500 shown in FIG. 5A corresponds to when there is only an IDC problem in either the MCG or the SCG. However, when there is an IDC problem in both the MCG and the SCG, reporting multiple HARQ bitmap patterns may be useful when the length of SubframePattern is different for the MCG and the SCG. For example when the MCG uses TDD configuration 0 (e.g., length of SubframePattern is 70) and the SCG uses configuration 1 (e.g., length of Subframe-Pattern is 10), the UE can report both subframeConfig0 (for the MCG) and subframeConfig1-5 (for the SCG). The MeNB knows that subframeConfig0 is for the MCG and configures DRX accordingly. The MeNB forwards the RRC InDeviceCoexIndication message to the SeNB. The SeNB knows that subframeConfig1-5 is for the SCG and configure DRX accordingly.

For example, in the method 520 shown in FIG. 5B, the MeNB receives 522 an IDC indication message from the UE including a first HARQ bitmap pattern and a second HARQ bitmap pattern. The MeNB forwards 524 the IDC indication message to the SeNB. Based on a predetermined first subframe pattern length, the MeNB selects 526 the first HARQ bitmap to configure DRX parameters in the MCG for interference resolution. Based on a predetermined second subframe pattern length, the SeNB selects 528 the second HARQ bitmap to configure DRX parameters in the SCG for interference resolution.

Figure 6:
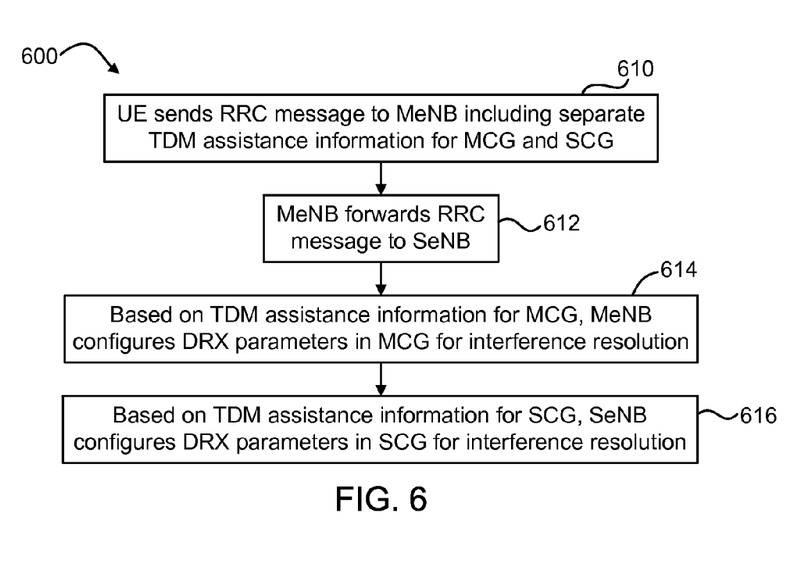
FIG. 6 illustrates a flow chart of a method for in-device co-existence interference mitigation according to one embodiment.

In other embodiments, the UE reports separate TDM assistance information for the MCG and the SCG. In certain such embodiments, the example RRC message InDevice-CoexIndication shown above may include both the IE tdm-AssistanceInfo and a new IE tdm-AssistanceInfoSCG so that the UE can report TDM assistance information for the SCG. For example, FIG. 6 illustrates a flow chart of a method 600 for in-device co-existence interference mitigation according to one embodiment. The method 600 includes the UE sending 610 an RRC message to the MeNB including separate TDM assistance information for the MCG and the SCG. The MeNB forwards 612 the RRC message to the SeNB. Based on the TDM assistance information for the MCG, the MeNB configures 614 DRX parameters in MCG for interference resolution. Based on the TDM assistance information for the SCG, the SeNB configures DRX parameters in the SCG for interference resolution.

Figure 7:
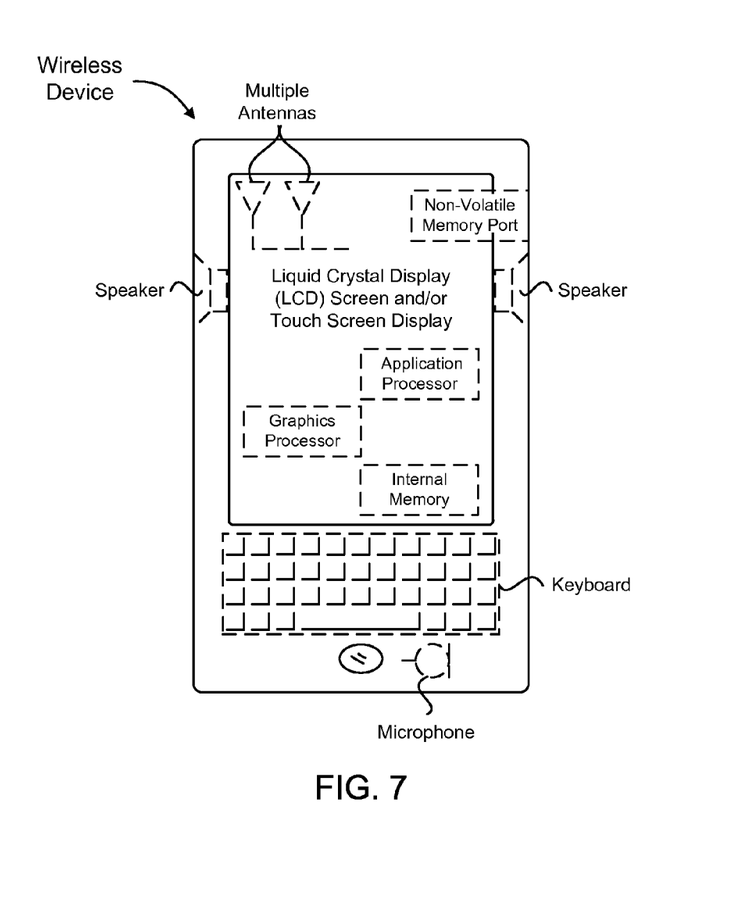
FIG. 7 is an example illustration of a mobile device that may be used according to certain embodiments.

FIG. 7 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Additional Example Embodiments

The following are examples of further embodiments:

Example 1 is a UE that includes a first transceiver, a second transcevier and a processor. The first transceiver is to communicate with a first node in a MCG in a 3GPP LTE wireless network. The second transceiver to communicate with a second node in a SCG in the 3GPP LTE wireless network. The UE is configured to operate in dual connectivity with both the first node and the second node. The processor is configured to determine that at least one carrier frequency for communication with the SCG through the second transceiver is affected by IDC interference. The processor is configured to send, to the first node through the first transceiver, a first message comprising TDM assistance information corresponding to the at least one carrier frequency of the SCG.

In Example 2, the processor of Example 1 is further configure to receive, through the first transceiver, a second message comprising a TDM solution for avoiding or reducing the IDC interference in the SCG.

In Example 3, the first message of any of Examples 1-2 includes a RRC message including one or more DRX parameters.

In Example 4, the TDM assistance information of any of Examples 1-3 includes a requested DRX starting offset reported according to MCG SFN timing.

In Example 5, the TDM assistance information of any of Examples 1-4 includes a requested DRX starting offset reported according to SCG SFN timing.

In Example 6, the TDM assistance information of any of Examples 1-5 comprises a HARQ bitmap reported according to an SCG configuration.

In Example 7, the processor of any of Examples 1-6 is further configured to determine that at least one carrier frequency for communication with the MCG through the first transceiver is affected by IDC interference.

In Example 8, the TDM assistance information of any of Examples 1-7 includes a requested DRX starting offset reported according to MCG SFN timing The processor is further configure to receive, through the first transceiver, a second message comprising a TDM solution for avoiding or reducing the IDC interference in both the MCG and the SCG.

In Example 9, the TDM assistance information of any of Examples 1-8 comprises a HARQ bitmap reported according to an SCG configuration. The processor is further configure to receive, through the first transceiver, a second message comprising a TDM solution for avoiding or reducing the IDC interference in both the MCG and the SCG.

In Example 10, the UE of any of Examples 1-9 further includes at least one non-3GPP transmitter, and the processor is configured to generate the TDM assistance information to avoid or reduce interference with a transmission of the at least one non-3GPP transmitter.

In Example 11, the TDM assistance information of any of Examples 1-10 includes a plurality of HARQ bitmaps, each HARQ bitmap comprising a different pattern length based on a TDD UL/DL configuration corresponding to one of the first node and the second node.

In Example 12, the TDM assistance information of any of Examples 1-11 includes first TDM assistance information corresponding to the MCG and second TDM assistance information corresponding to the SCG.

Example 13 is an eNB that includes a wireless transceiver and a processor. The wireless transceiver is configured to communicate with a UE using a first frequency associated with a first cell group. The processor is configured to receive, from the UE through the wireless transceiver, a first RRC message comprising interference information. The processor is configured to forward the interference information to a node in a second cell group wirelessly connected to the UE using a second frequency. The processor is configured to receive, from the node in the second cell group, a first TDM solution for the interference and forward the first TDM solution to the UE through the wireless transceiver.

In Example 14, the first RRC message of Example 13 includes a DRX starting offset associated with a SFN timing of the first cell group.

In Example 15, the processor of any of Examples 13-14 is further configured to determine a second TDM solution for the interference based on the SFN timing of the first cell group and send the second TDM solution to the UE through the wireless transceiver.

In Example 16, first RRC message of any of Examples 13-15 includes a DRX starting offset associated with a SFN timing of the second cell group.

In Example 17, the first RRC message of any of Examples 13-16 includes HARQ pattern information, and wherein before forwarding the interference information to the node in the second cell group, the processor is configured to determine whether the HARQ pattern information corresponds to the first cell group or the second cell group.

In Example 18, the processor of any of Examples 13-17 is further configured to determine that the HARQ pattern information includes a first HARQ pattern comprising a first subframe pattern length corresponding to the first cell group, and a second HARQ pattern comprising a second subframe pattern length corresponding to the second cell group. The processor is further configured to configure, based on the first HARQ pattern, DRX parameters for the first cell group to avoid or reduce in-device coexistence interference in the UE. The processor is further configured to forward the second HARQ pattern to the node in the second cell group.

Example 19 is a method that includes receiving, at a secondary eNB, a request for a DRX starting offset corresponding to a SFN timing of master eNB. The method includes, based on an SFN timing offset between the secondary eNB and the master eNB, using the requested DRX starting offset to select one or more DRX parameters to reduce or avoid in-device coexistence interference in a UE connected to both the secondary eNB and the master eNB. The method includes sending the one or more DRX parameters from the secondary eNB to the UE through the master eNB.

In Example 20, the method of Example 19 further includes receiving the request for the DRX starting offset at the secondary eNB from the master eNB through a non-ideal backhaul interface.

In Example 21, the method of any of Examples 19-20 further include receiving, at the secondary eNB from the master eNB, a HARQ bitmap pattern requested by the UE for secondary eNB and further configuring the one or more DRX parameters based on the HARQ bitmap pattern.

Example 22 is a method that includes communicating, using a first transceiver of UE, using a first node in a MCG in a 3GPP LTE wireless network. The method includes communicating, using a second transceiver of the UE, with a second node in a SCG in the 3GPP LTE wireless network, the UE configured to operate in dual connectivity with both the first node and the second node. The method includes determining that at least one carrier frequency for communication with the SCG through the second transceiver is affected by IDC interference. The method includes sending, to the first node through the first transceiver, a first message comprising TDM assistance information corresponding to the at least one carrier frequency of the SCG.

In Example 23, the method of Example 22 further includes receiving, through the first transceiver, a second message comprising a TDM solution for avoiding or reducing the IDC interference in the SCG.

In Example 24, the first message of any of Examples 22-23 includes a RRC message including one or more DRX parameters.

In Example 25, the TDM assistance information of any of Examples 22-24 includes a requested DRX starting offset reported according to MCG SFN timing.

In Example 26, the TDM assistance information of any of Examples 22-25 includes a requested DRX starting offset reported according to SCG SFN timing.

In Example 27, the TDM assistance information of any of Examples 22-26 includes a HARQ bitmap reported according to an SCG configuration.

In Example 28, the method of any of Examples 22-27 further includes determining that at least one carrier frequency for communication with the MCG through the first transceiver is affected by IDC interference.

In Example 29, the TDM assistance information of any of Examples 22-28 includes a requested DRX starting offset reported according to MCG SFN timing. The method further includes receiving, through the first transceiver, a second message comprising a TDM solution for avoiding or reducing the IDC interference in both the MCG and the SCG.

In Example 30, the TDM assistance information of any of Examples 22-29 includes a HARQ bitmap reported according to an SCG configuration. The method further includes receiving, through the first transceiver, a second message comprising a TDM solution for avoiding or reducing the IDC interference in both the MCG and the SCG.

In Example 31, the method of any of Examples 22-30 further includes generating the TDM assistance information to avoid or reduce interference with a transmission of at least one non-3GPP transmitter of the UE.

In Example 32, the TDM assistance information of any of Examples 22-31 includes a plurality of HARQ bitmaps, each HARQ bitmap including a different pattern length based on a TDD UL/DL configuration corresponding to one of the first node and the second node.

In Example 33, the TDM assistance information of any of Examples 22-32 includes first TDM assistance information corresponding to the MCG and second TDM assistance information corresponding to the SCG.

Example 34 is a method that includes communicating, using a wireless transceiver of an eNB, with a UE using a first frequency associated with a first cell group. The method includes receiving, from the UE through the wireless transceiver, a first RRC message comprising interference information. The method includes forwarding the interference information to a node in a second cell group wirelessly connected to the UE using a second frequency. The method includes receiving, from the node in the second cell group, a first TDM solution for the interference. The method includes forwarding the first TDM solution to the UE through the wireless transceiver.

In Example 35, the first RRC message of Example 34 includes a DRX starting offset associated with a SFN timing of the first cell group.

In Example 36, the method of any of Examples 34-35 further includes determining a second TDM solution for the interference based on the SFN timing of the first cell group, and sending the second TDM solution to the UE through the wireless transceiver.

In Example 37, the first RRC message of any of Examples 34-36 includes a DRX starting offset associated with a SFN timing of the second cell group.

In Example 38, first RRC message of any of Examples 34-37 includes HARQ pattern information. Before forwarding the interference information to the node in the second cell group, the method further includes determining whether the HARQ pattern information corresponds to the first cell group or the second cell group.

In Example 39, method of any of Examples 34-38 further includes determining that the HARQ pattern information includes a first HARQ pattern including a first subframe pattern length corresponding to the first cell group, and a second HARQ pattern including a second subframe pattern length corresponding to the second cell group. The method includes configuring, based on the first HARQ pattern, DRX parameters for the first cell group to avoid or reduce in-device coexistence interference in the UE. The method includes forwarding the second HARQ pattern to the node in the second cell group.

Example 40 is a method that includes receiving, at a secondary eNB, a request for a DRX starting offset corresponding to a SFN timing of master eNB. The method includes, based on an SFN timing offset between the secondary eNB and the master eNB, useing the requested DRX starting offset to select one or more DRX parameters to reduce or avoid in-device coexistence interference in a UE connected to both the secondary eNB and the master eNB. The method includes sending the one or more DRX parameters from the secondary eNB to the UE through the master eNB.

In Example 41, the method of Example 40 further includes receiving the request for the DRX starting offset at the secondary eNB from the master eNB through a non-ideal backhaul interface.

In Example 42, the method of any of Examples 40-41 further includes receiving, at the secondary eNB from the master eNB, a HARQ bitmap pattern requested by the UE for secondary eNB and further configuring the one or more DRX parameters based on the HARQ bitmap pattern.

Example 43 is an apparatus including means to perform the method of any of Examples 22-42.

Example 44 is machine readable storage including machine-readable instructions to implement a method or realize an apparatus as in any of Examples 22-43.

Various techniques disclosed herein, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more modules or components, which are terms used to more particularly emphasize their implementation independence. For example, a module or component may be implemented as a hardware circuit comprising custom very large scale integration (VLSI) circuits or gate arrays, off-the-shelf semiconductors such as logic chips, transistors, or other discrete components. A module or component may also be implemented in programmable hardware devices such as field programmable gate arrays, programmable array logic, programmable logic devices, or the like.

Modules or components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified module or component need not be physically located together, but may comprise disparate instructions stored in different locations that, when joined logically together, comprise the module or component and achieve the stated purpose for the module or component.

Indeed, a module or component of executable code may be a single instruction, or many instructions, and may even be distributed over several different code segments, among different programs, and across several memory devices. Similarly, operational data may be identified and illustrated herein within modules or components, and may be embodied in any suitable form and organized within any suitable type of data structure. The operational data may be collected as a single data set, or may be distributed over different locations including over different storage devices, and may exist, at least partially, merely as electronic signals on a system or network. The modules or components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

It will be understood by those having skill in the art that many changes may be made to the details of the above-described embodiments without departing from the underlying principles of the invention. The scope of the present invention should, therefore, be determined only by the following claims.

The invention claimed is:

1. A user equipment (UE) comprising:
a first transceiver to communicate with a first node in a master cell group (MCG) in a third generation partnership project (3GPP) long term evolution (LTE) wireless network;
a second transceiver to communicate with a second node in a secondary cell group (SCG) in the 3GPP LTE wireless network, the UE configured to operate in dual connectivity with both the first node and the second node;
a processor to:
determine that at least one carrier frequency for communication with the SCG through the second transceiver is affected by in-device coexistence (IDC) interference; and
send, to the first node through the first transceiver, a first message comprising time-division multiplexing (TDM) assistance information corresponding to the at least one carrier frequency of the SCG.

2. The UE of claim 1, wherein the processor is further configure to receive, through the first transceiver, a second message comprising a TDM solution for avoiding or reducing the IDC interference in the SCG.

3. The UE of claim 1, wherein the first message comprises a radio resource control (RRC) message including one or more discontinuous reception (DRX) parameters.

4. The UE of claim 1, wherein the TDM assistance information comprises a requested discontinuous reception (DRX) starting offset reported according to MCG system frame number (SFN) timing.

5. The UE of claim 1, wherein the TDM assistance information comprises a requested discontinuous reception (DRX) starting offset reported according to SCG system frame number (SFN) timing.

6. The UE of claim 1, wherein the TDM assistance information comprises a hybrid automatic repeat request (HARQ) bitmap reported according to an SCG configuration.

7. The UE of claim 1, wherein the processor is further configured to:
determine that at least one carrier frequency for communication with the MCG through the first transceiver is affected by in-device coexistence (IDC) interference.

8. The UE of claim 7, wherein the TDM assistance information comprises a requested discontinuous reception (DRX) starting offset reported according to MCG system frame number (SFN) timing; and wherein the processor is further configure to receive, through the first transceiver, a second message comprising a TDM solution for avoiding or reducing the IDC interference in both the MCG and the SCG.

9. The UE of claim 7, wherein the TDM assistance information comprises a hybrid automatic repeat request (HARQ) bitmap reported according to an SCG configuration; and wherein the processor is further configure to receive, through the first transceiver, a second message comprising a TDM solution for avoiding or reducing the IDC interference in both the MCG and the SCG.

10. The UE of claim 1, further comprising at least one non-3GPP transmitter, and wherein the processor is configured to generate the TDM assistance information to avoid or reduce interference with a transmission of the at least one non-3GPP transmitter.

11. The UE of claim 1, wherein the TDM assistance information comprises a plurality of hybrid automatic repeat request (HARQ) bitmaps, each HARQ bitmap comprising a different pattern length based on a time-division duplexing (TDD) uplink/downlink (UL/DL) configuration corresponding to one of the first node and the second node.

12. The UE of claim 1, wherein the TDM assistance information comprises first TDM assistance information corresponding to the MCG and second TDM assistance information corresponding to the SCG.

13. An Evolved Universal Terrestrial Radio Access Network (E-UTRAN) Node B (eNB) comprising:
a wireless transceiver to communicate with a user equipment (UE) using a first frequency associated with a first cell group;
a processor configured to:
receive, from the UE through the wireless transceiver, a first radio resource control (RRC) message comprising interference information;
forward the interference information to a node in a second cell group wirelessly connected to the UE using a second frequency;
receive, from the node in the second cell group, a first time-division multiplexing (TDM) solution for the interference; and
forward the first TDM solution to the UE through the wireless transceiver.

14. The eNB of claim 13, wherein the first RRC message comprises a discontinuous reception (DRX) starting offset associated with a system frame number (SFN) timing of the first cell group.

15. The eNB of claim 14, wherein the processor is further configured to:
determine a second TDM solution for the interference based on the SFN timing of the first cell group; and
send the second TDM solution to the UE through the wireless transceiver.

16. The eNB of claim 15, wherein first RRC message comprises a discontinuous reception (DRX) starting offset associated with a system frame number (SFN) timing of the second cell group.

17. The eNB of claim 13, wherein the first RRC message comprises hybrid automatic repeat request (HARQ) pattern information, and wherein before forwarding the interference information to the node in the second cell group, the processor is configured to determine whether the HARQ pattern information corresponds to the first cell group or the second cell group.

18. The eNB of claim 17, wherein the processor is further configured to:
determine that the HARQ pattern information includes a first HARQ pattern comprising a first subframe pattern length corresponding to the first cell group, and a second HARQ pattern comprising a second subframe pattern length corresponding to the second cell group;
configure, based on the first HARQ pattern, discontinuous reception (DRX) parameters for the first cell group to avoid or reduce in-device coexistence interference in the UE; and
forward the second HARQ pattern to the node in the second cell group.

19. A method comprising:
receiving, at a secondary Evolved Universal Terrestrial Radio Access Network (E-UTRAN) Node B (eNB), a request for a discontinuous reception (DRX) starting offset corresponding to a system frame number (SFN) timing of master eNB;
based on an SFN timing offset between the secondary eNB and the master eNB, use the requested DRX starting offset to select one or more DRX parameters to reduce or avoid in-device coexistence interference in a user equipment (UE) connected to both the secondary eNB and the master eNB; and
sending the one or more DRX parameters from the secondary eNB to the UE through the master eNB.

20. The method of claim 19, further comprising receiving the request for the DRX starting offset at the secondary eNB from the master eNB through a non-ideal backhaul interface.

21. The method of claim 19, further comprising:
receiving, at the secondary eNB from the master eNB, a hybrid automatic repeat request (HARQ) bitmap pattern requested by the UE for secondary eNB; and
further configuring the one or more DRX parameters based on the HARQ bitmap pattern.

* * * * *